(12) United States Patent
Hooton et al.

(10) Patent No.: US 8,794,775 B2
(45) Date of Patent: Aug. 5, 2014

(54) CAMERA LIGHT SOURCE MOUNTING STRUCTURES

(71) Applicant: Apple Inc., Cupertino, CA (US)

(72) Inventors: Lee E. Hooton, Cupertino, CA (US); Michael B. Wittenberg, Mountain View, CA (US); Shayan Malek, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/628,773

(22) Filed: Sep. 27, 2012

(65) Prior Publication Data

US 2014/0085859 A1 Mar. 27, 2014

(51) Int. Cl.
*G03B 15/03* (2006.01)

(52) U.S. Cl.
USPC .............................................. 362/3; 396/155

(58) Field of Classification Search
None
See application file for complete search history.

(56) References Cited

U.S. PATENT DOCUMENTS

| | | | |
|---|---|---|---|
| 6,426,704 B1 | 7/2002 | Hutchison | |
| 6,528,778 B1 * | 3/2003 | Kimba et al. | 250/214.1 |
| 7,819,559 B2 * | 10/2010 | Nishihara et al. | 362/333 |
| 7,828,465 B2 * | 11/2010 | Roberge et al. | 362/294 |
| 7,920,784 B2 * | 4/2011 | Ito | 396/155 |
| 2011/0121076 A1 * | 5/2011 | Hennick et al. | 235/454 |
| 2012/0170119 A1 | 7/2012 | Chu et al. | |

FOREIGN PATENT DOCUMENTS

WO 2009046513 4/2009

OTHER PUBLICATIONS

Wittenberg et al., U.S. Appl. No. 13/607,440, filed on Sep. 7, 2012.
Dolci et al., U.S. Patent Appl. No. 13/623,436, filed on Sep. 20, 2012.

\* cited by examiner

*Primary Examiner* — Diane Lee
*Assistant Examiner* — James Ellias
(74) *Attorney, Agent, or Firm* — Treyz Law Group; G. Victor Treyz; Jennifer Luh (57) ABSTRACT

An electronic device may be provided with an electronic component such as a camera light source containing a light-emitting diode. During operation, the light-emitting diode may produce heat. Thermally conducting elastomeric structures may have features such as sidewalls that mate with external surface of the camera light source or other electronic component to dissipate heat from the electronic component. Metal structures such as a bracket may be used to press the elastomeric structures and the electronic component towards a wall of a housing for the electronic device. Support structures may be interposed between the wall of the housing and the elastomeric structures. The support structures may have an opening that is aligned with an opening in the housing wall. Insert structures may be received within the opening in the support structures. The electronic component may be aligned with the insert structures and the opening in the support structures.

21 Claims, 7 Drawing Sheets

CAMERA LIGHT SOURCE MOUNTING STRUCTURES

BACKGROUND

This relates generally to electronic devices, and more particularly, electronic devices having electronic components such as camera light sources.

Electronic devices such as portable computers, tablet computers, and cellular telephones are often provided with cameras. Light sources such as light-emitting diodes may be used to provide camera illumination in low light situations.

It may be challenging to provide camera light sources that are as compact as desired. In some situations, a camera light source may be operated continuously. This type of operation may generate relatively large amounts of heat. Unless care is taken, a camera light source and other device components may become damaged from overheating. Light sources may be mounted on flexible printed circuits that use metal stiffeners to help dissipate heat, but this type of configuration may not dissipate heat as efficiently as desired. Conventional light source mounting arrangements may also not provide a desired amount of shock resistance during drop events.

It would therefore be desirable to be able to provide improved ways of installing components such as camera light sources in electronic devices.

SUMMARY

An electronic device may be provided with an electronic component that generates heat during operation. The electronic device may have a housing such as a metal housing. Component mounting structures may be used to mount the electronic component within the housing so that the component is provided with shock resistance and so that heat is dissipated from the electronic component during operation.

The housing may have an opening. Support structures that have an opening may be attached to the housing so that the opening in the support structures is aligned with the opening in the housing. Insert structures may be mounted within the opening in the support structures. The insert structures may include an insert member with an opening that is aligned with the opening in the support structures and a glass layer that covers the opening in the insert member. Recessed corners in the insert structures may be configured to receive leg portions of the electronic component.

The electronic component may be a light source such as a camera light source that includes a light-emitting diode. During operation, the light-emitting diode may produce heat. Thermally conducting elastomeric structures in the component mounting structures may be provided with features such as sidewalls that mate with external surface of the camera light source or other electronic component to dissipate heat from the electronic component. Metal structures such as a bracket in the mounting structures may be used to press the elastomeric structures and the electronic component towards a wall of the metal housing.

The metal bracket may be attached to the support structures using screws or other attachment mechanisms. Heat may be conducted away from the electronic component and into the housing the thermally conducting elastomeric structures, the metal bracket, the screws, and the support structures.

Further features of the invention, its nature and various advantages will be more apparent from the accompanying drawings and the following detailed description of the preferred embodiments.

DETAILED DESCRIPTION

Figure 1:
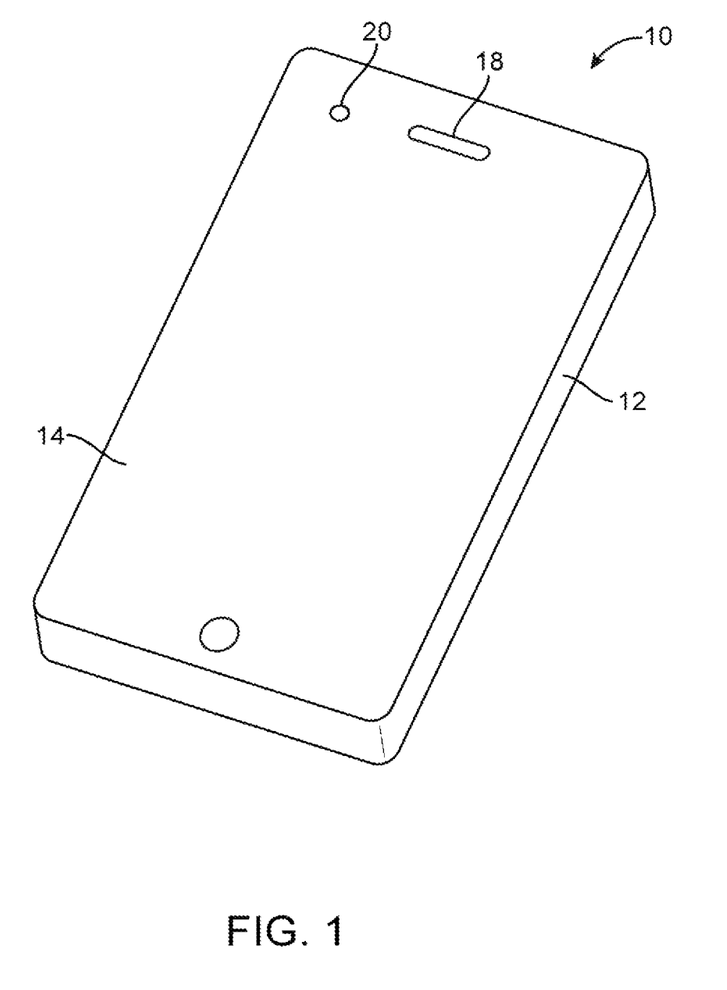
FIG. 1 is a front perspective view of an illustrative electronic device of the type that may include a camera light source in accordance with an embodiment of the present invention.

Electronic devices such as electronic device 10 of FIG. 1 may be provided with camera structures. For example, device 10 of FIG. 1 may be provided with one or more digital camera modules. Each camera module may have a digital image sensor and lens structures for capturing digital images. There may be any suitable number of camera modules in device 10. For example, there may be one camera module in device 10, there may be two camera modules in device 10, or there may be three or more camera modules in device 10 (as examples).

Device 10 of FIG. 1 may be portable electronic equipment such as a cellular telephone, a tablet computer, a media player, a wrist-watch device, a pendant device, an earpiece device, a notebook computer, other compact portable devices, or other electronic equipment such as a computer monitor with an integrated computer, a computer monitor, a desktop computer, a set-top box, or a television.

Device 10 of FIG. 1 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. Housing 12 may be formed from a unibody structure (e.g., a structure that is machined from a single piece of material) or may include internal frame structures and exterior wall structures (as examples). Other types of housing construction may also be used if desired.

Device 10 may have a display such as display 14. Display 14 may be a touch screen that incorporates touch sensitive structures such as capacitive touch electrodes or display 14 may be touch insensitive. Display 14 may include display pixels formed from light-emitting diodes (LEDs), organic LEDs (OLEDs), plasma cells, electrophoretic display elements, electrowetting display elements, liquid crystal display (LCD) components, or other suitable display pixel structures. A cover layer such as a layer of glass or clear plastic may cover the surface of display 14. Buttons and speaker port openings may pass through openings in the cover glass. For example, the cover layer for display 14 may have an opening for a front-facing button such as button 16 and a speaker opening such as speaker port opening 18.

Portions of display 14 may form active regions (i.e., regions in which the display pixels of display 14 form images for a user). Portions of display 14 may also form inactive regions (e.g., peripheral portions of display 14 that to not have any active display pixels). Camera window structures such as a camera window structure for camera 20 of FIG. 1 may be provided in the cover layer for display 14 (e.g., to form a front-facing camera). The camera windows structures may be formed from transparent materials such as glass, plastic, or other transparent materials. Camera 20 of FIG. 1 may, for example, be formed using a window in an inactive portion of display 14. The display cover layer in the inactive portion of display 14 may be provided with an opaque masking layer such as a layer of black ink. Camera 20 may be aligned with an opening in the opaque masking layer.

If desired, cameras 20 may be formed elsewhere in device housing 12. As shown in the rear perspective view of device 10 of FIG. 2, for example, a camera such as camera 20 may be located on the rear surface of housing 12 (e.g., to form a rear-facing camera).

Figure 2:
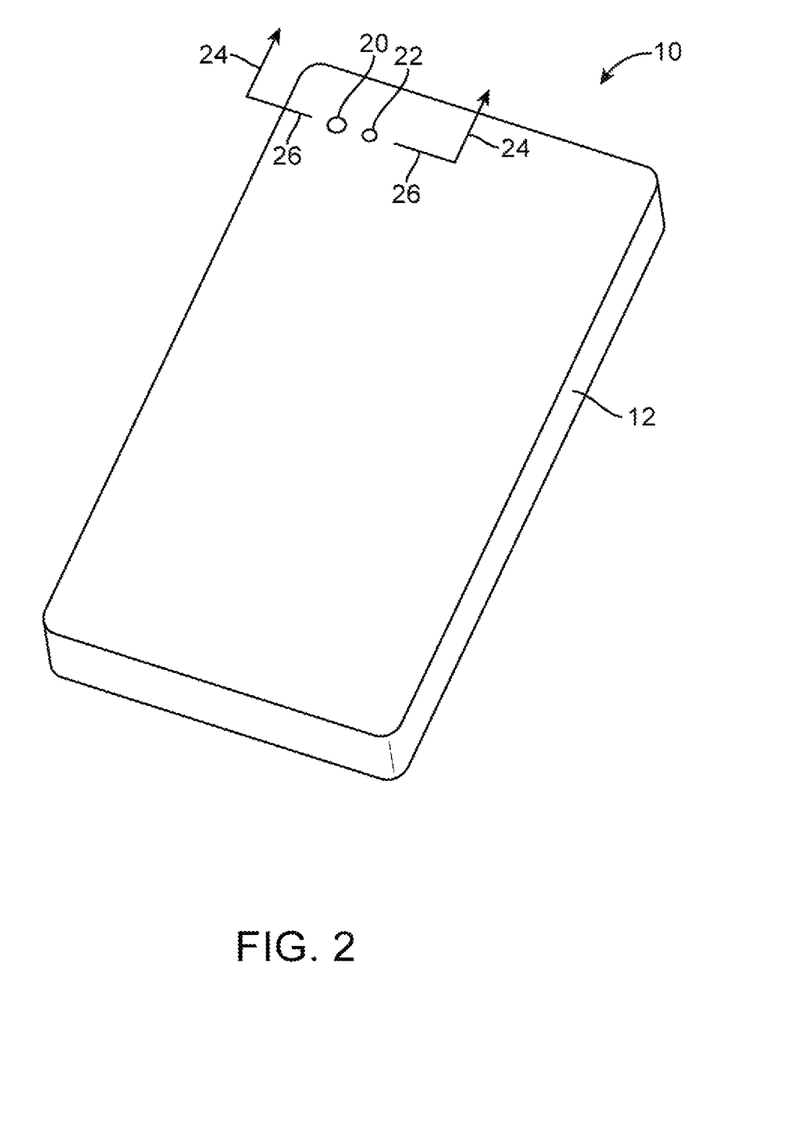
FIG. 2 is a rear perspective view of an illustrative electronic device of the type that may include an electronic component such as a camera light source in accordance with an embodiment of the present invention.

Cameras such as front-facing camera 20 of FIG. 1 and/or rear facing camera 20 of FIG. 2 may be provided with light sources. Camera light sources such as illustrative camera light source 22 of FIG. 2 may be used to provide brief bursts of light during the acquisition of still images (i.e., light source 22 may serve as a camera flash) and may provide more prolonged illumination (e.g., when illuminating a subject for a video clip or when implementing red-eye reduction functions). Camera light sources such as camera light source 22 on the rear of device 10 may be implemented using lamps, light-emitting diodes, or other sources of light. Configurations in which camera light sources such as camera light source 22 are formed using light-emitting diodes are sometimes described herein as an example.

Figure 3:
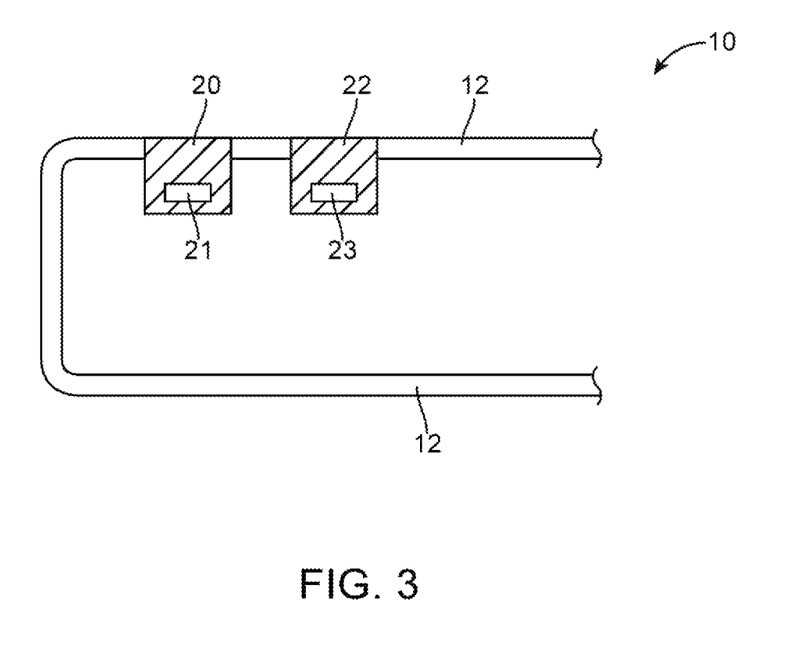
FIG. 3 is a cross-sectional side view of the electronic device of FIG. 2 showing how the electronic device may have a camera module and an adjacent camera light source in accordance with an embodiment of the present invention.

FIG. 3 is a cross-sectional side view of electronic device 10 taken along line 26 of FIG. 2 and viewed in direction 24. The cross-sectional side view of FIG. 3 shows how camera light source 22 may be mounted in housing 12 adjacent to camera module 20. In general, there may be one camera light source 22 in device 10, two camera light sources 22 in device 10, or three or more camera light sources 22 in device 10. The illustrative configuration of FIGS. 1, 2, and 3 in which there is a single camera light source in device 10 is merely illustrative.

As shown in FIG. 3, camera module 20 may include a digital image sensor such as digital image sensor 21. Camera light source 22 may include a light source such as light-emitting diode 23.

Figure 4:
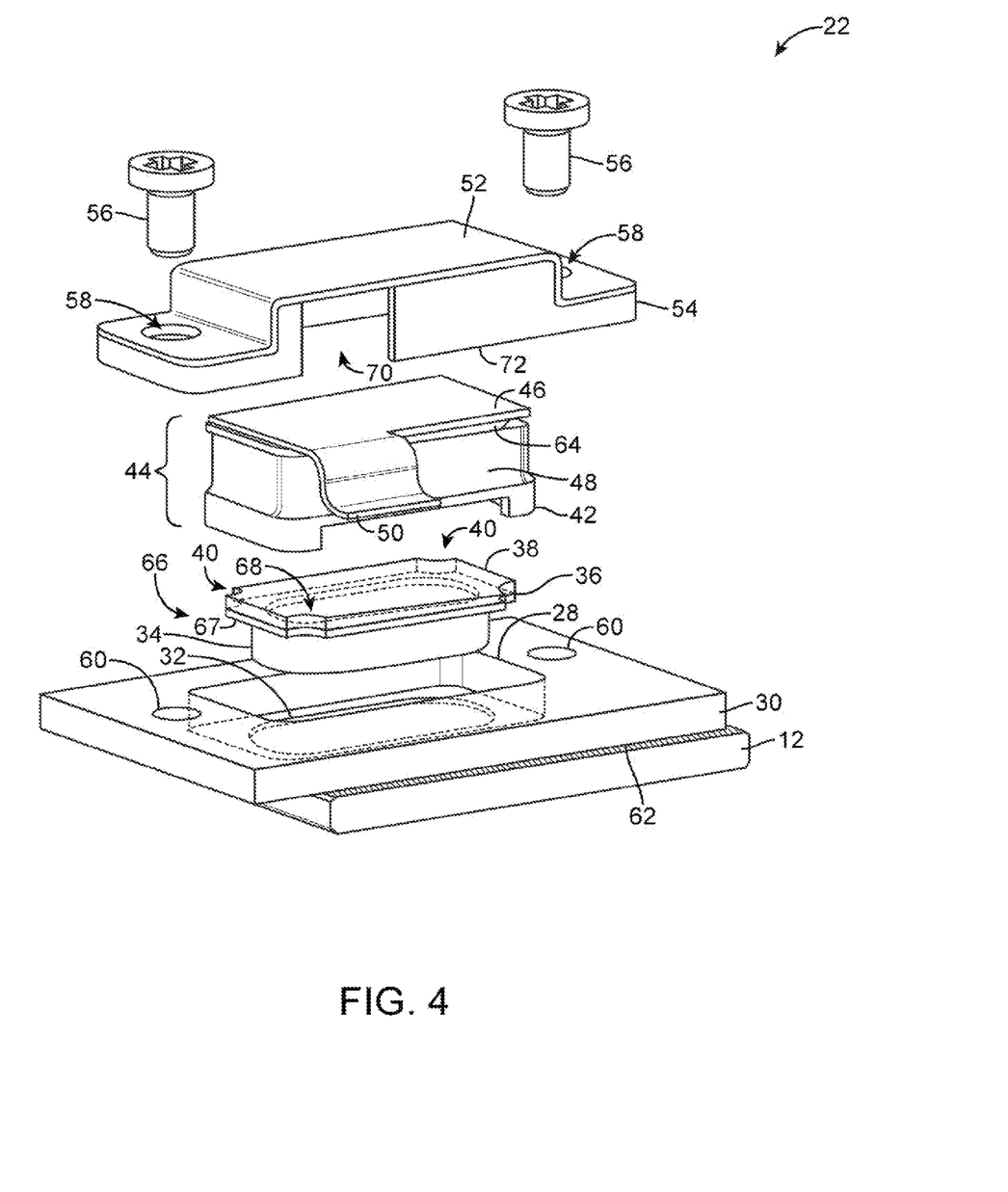
FIG. 4 is an exploded perspective view of an illustrative camera light source in accordance with an embodiment of the present invention.

FIG. 4 is an exploded perspective view of component mounting structures of the type that may be associated with mounting an electronic component such as light source 22 within housing 12 of electronic device 10. As shown in FIG. 4, light source structures 22 may include support structures such as support structures 30. Support structures 30 may have an opening such as rectangular opening 28. Support structures 30 may be formed from a material such as plastic or metal. As an example, support structures 30 may be formed from a metal such as aluminum or stainless steel to promote thermal conduction (as an example). Support structures 30 may be attached to housing wall 12 using adhesive 62 or other attachment mechanisms (welds, screws or other fasteners, etc.).

Housing 12 may have an opening such as illustrative oval-shaped camera light source opening 32. Support structures 30 may be mounted on housing 12 so that opening 28 in support structures 30 is aligned with opening 32 in housing wall 12.

Light source structures 22 may include a light-generating component such as a light source module 44. Light-emitting diode 23 (FIG. 3) may be mounted within light source module 44 (e.g., on the underside of rigid printed circuit board 64). A flexible printed circuit such as flexible printed circuit 46 may be coupled to printed circuit board 64. Conductive traces on tail portion 50 of flexible printed circuit 46 may be used to route signals to light-emitting diode 23 to control the operation of light-emitting diode 23.

Structures such as insert structures 66 may be used in mounting light source module 44 within support structures 30 and housing 12. Insert structures 66 may have an insert member such as insert member 34. Insert member 34 may be formed from plastic or metal (e.g., aluminum, stainless steel, etc.). Insert member 34 may have an opening such as opening 68 that is aligned with opening 28 and opening 32. A transparent window structure such as transparent glass window 38 may be attached to insert 34 over opening 68 using adhesive 36. Corner recesses 40 may be configured to receive corresponding portions of light source module 44 such as leg portions 42. When assembled, leg portions 42 will be received within recesses 40. The side walls of insert member 34 will be received within oval opening 32 of housing wall 12. Upper lip portion 67 of insert member 34 in insert structures 66 will be received within opening 28. Recesses 40 create openings between lip 67 and the inner walls of opening 28 in support structures 30 that can hold leg portions 42 and therefore light source module 44 in a desired position relative to openings 68, 28, and 32.

Light source module 44 may be mounted within device 10 using mounting structures that provide shock resistance and heat dissipation. As shown in FIG. 4, for example, a thermally conductive material such as thermally conductive elastomeric structures 54 may cover and surround light source module 44. A metal mounting structure such as metal bracket 52 may be used to hold thermally conductive elastomeric structures 54 in place. Bracket 52, which may sometimes be referred to as a cowling, may have openings such as screw holes 58 through which screws 56 may pass. Screws 56 may be formed from a thermally conductive material such as metal. Screws 56 may have threaded shafts that are received within threaded openings 60 of support structures 30.

Thermally conductive elastomeric structures 54 may be formed from a material such as silicone or other elastomeric polymer that has been provided with thermally conductive additives to ensure that structures 54 exhibit a desired amount of thermal conductivity. As an example, structures 54 may be formed from a material that exhibits a thermal conductivity of 0.3 W/mK or more, 1 W/mK or more, or 2.5 W/mK or more.

Thermally conductive elastomeric structures 54 may be formed using a molding process or other suitable fabrication techniques. Structures 54 may, for example, be molded in a die having a shape that matches the shape of the exterior of light source module 44, so that structures 54 mate with light source module 44, thereby ensuring satisfactory thermal conduction between light source module 44 and structures 54. Structures 54 may also have surfaces that mate with metal structures such as bracket 52. This allows heat that is generated by light source module 44 during operation of light-emitting diode 23 to be conducted to thermally conductive elastomeric structures 54 and, via structures 54 to a metal mounting structure such as bracket 52. Heat may then be dissipated from the surface of bracket 52 and may be conducted away from light source module 44 and bracket 52 into housing 12 via screws 56 and support structure 30.

If desired, thermally conductive elastomeric structures 54 may be provided with an opening such as opening 70 to accommodate flexible printed circuit tail portion 50 of flexible printed circuit 46. Vertical walls such as walls 72 of thermally conductive elastomeric structures 54 may be used to surround the sides of light source module 44.

Figure 5:
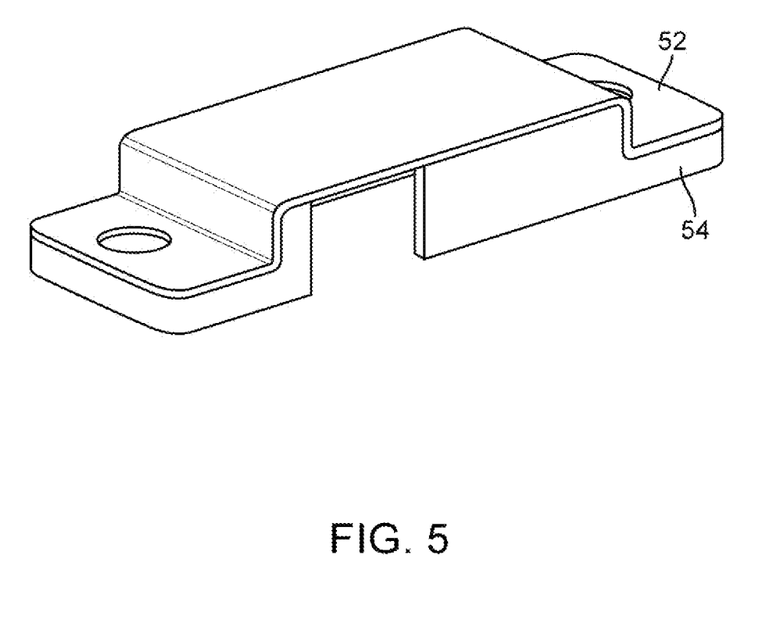
FIG. 5 is a top perspective view of an illustrative cowling structure for a camera light source in accordance with an embodiment of the present invention.
Figure 6:
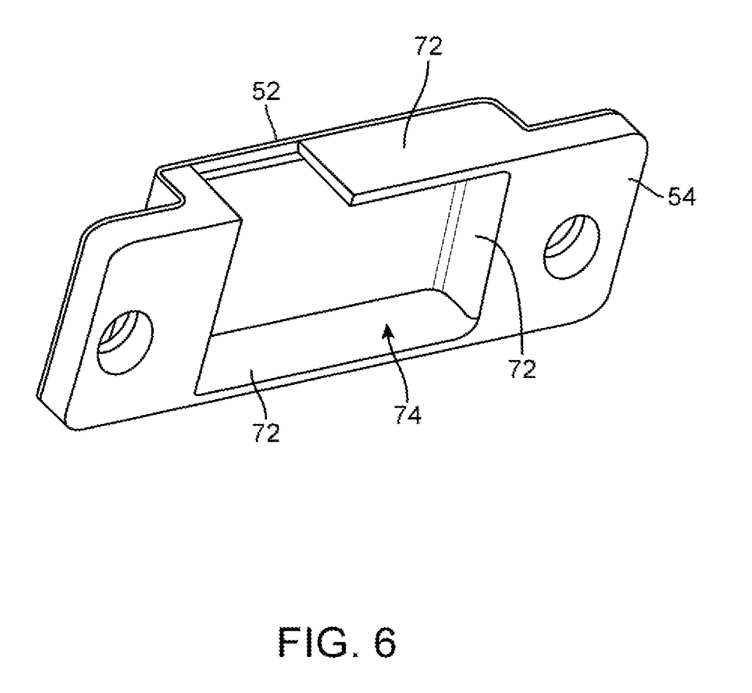
FIG. 6 is a bottom perspective view of the illustrative cowling structure of FIG. 5 in accordance with an embodiment of the present invention.

FIG. 5 is a top perspective view of thermally conductive elastomeric material 54 and cowling 52. FIG. 6 is a bottom perspective view of thermally conductive elastomeric structures 54 and cowling 52. As shown in FIG. 6, vertical sidewalls such as sidewalls 72 may form an opening in the underside of structures 54 such as opening 74. Opening 74 may have a shape that is configured to mate with the exterior surfaces of light source 44 of FIG. 4, so that heat may be efficiently conducted away from light source 44 during operation.

Figure 7:
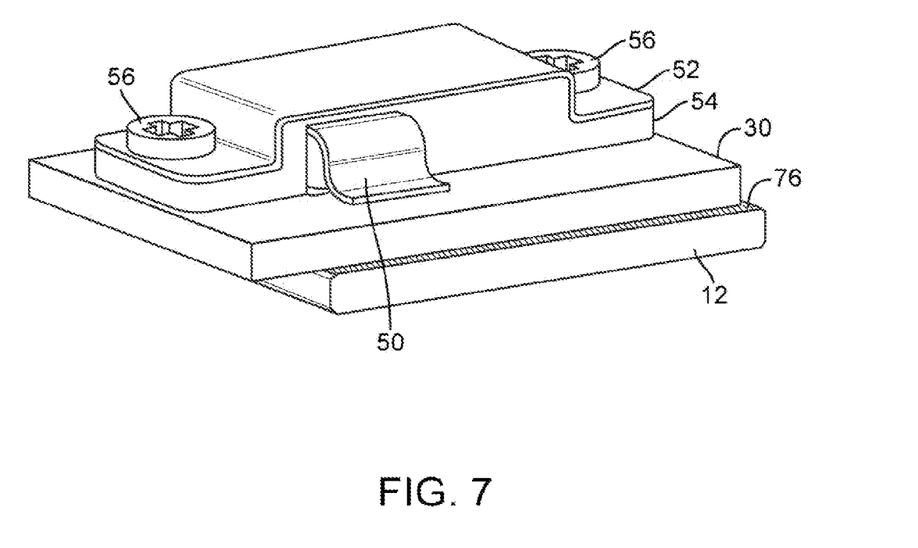
FIG. 7 is a perspective view of an illustrative camera light source of the type shown in FIG. 4 mounted to the inner surface of a wall in an electronic device housing in accordance with an embodiment the present invention.

FIG. 7 is a perspective view of light source structures 22 of FIGS. 4, 5, and 6 when assembled on inner surface 76 of housing 12. In the illustrative configuration of FIG. 7, bracket 52 has the shape of a metal strip with bent portions forming two opposing vertical sidewalls on opposing vertical sides of thermally conductive elastomeric structures 54. If desired, bracket 52 may have other shapes (e.g., shapes with fewer vertical sidewalls or more vertical sidewalls, shapes that allow bracket 52 to be mounted within device 10 without using screws, etc.).

In the configuration of FIG. 7, screws 56 are screwed into threaded openings in support structure 30. If desired, threaded openings for screws 56 may be formed directly within housing 12. In this type of configuration, support structures 30 may be eliminated or reduced in size and corresponding structures formed directly in the material of housing 12 (e.g., by machining the features of support structures 30 in housing 12). Thermal grease and other thermally conductive materials may, if desired, be used in conjunction with elastomeric structures 54 to improve heat transfer efficiency. Electronic components such as camera modules, integrated circuits, lamps, light-emitting diodes, and other components that generate heat may be mounted using a configuration of the type shown in FIG. 7. The use of the thermal conduction and mounting structures of FIG. 7 to mount and heat sink the structures of camera light source 22 is merely illustrative.

The foregoing is merely illustrative of the principles of this invention and various modifications can be made by those skilled in the art without departing from the scope and spirit of the invention. Any of the foregoing embodiments may be used alone or in combination with one or more of any of the other foregoing embodiments.

What is claimed is:

1. An electronic device, comprising:
    a housing wall;
    a light source;
    thermally conductive elastomeric structures that are configured to dissipate heat from the light source; and
    a metal structure configured to mount the thermally conductive elastomeric structures and the light source to the housing wall, wherein the metal structure is mounted over the thermally conductive elastomeric structures and the light source.

2. The electronic device defined in claim 1 wherein the light source comprises a camera light source module that includes a light-emitting diode.

3. The electronic device defined in claim 2 wherein the metal structure includes screw holes and wherein the electronic device comprises screws that pass through the screw holes to mount the metal structure.

4. The electronic device defined in claim 1 wherein the housing wall has a housing wall opening, the electronic device further comprising a support structure with a support structure opening that is aligned with the housing wall opening, wherein the support structure has threaded holes that are configured to receive screws that mount the metal structure over the thermally conductive elastomeric structures.

5. The electronic device defined in claim 4 wherein the support structure comprises metal.

6. The electronic device defined in claim 5 wherein the light source comprises a module with an external surface and wherein the thermally conductive elastomeric structures have walls that are configured to mate with the external surface.

7. The electronic device defined in claim 6 wherein the light source includes a flexible printed circuit having a tail portion and wherein the walls of the thermally conductive elastomeric structures have an opening through which the tail portion passes.

8. The electronic device defined in claim 1 wherein the thermally conductive elastomeric structures comprise silicone and wherein the metal structure comprises a bracket mounted over the thermally conductive elastomeric structures to hold the thermally conductive elastomeric structures over the light source.

9. The electronic device defined in claim 1 wherein the housing wall has a housing wall opening, the electronic device further comprising a support structure with a support structure opening that is interposed between the housing wall and the light source.

10. The electronic device defined in claim 9 further comprising an insert structure having an insert structure opening that is aligned with the support structures opening and the housing wall opening, wherein the insert structure has a first portion is received within the housing wall opening and a second portion that is received within the support structure opening.

11. The electronic device defined in claim 10 wherein the insert structure includes a glass window overlapping the insert structure opening.

12. The electronic device defined in claim 11, wherein the light source comprises leg portions, wherein the second portion of the insert structure has recessed corners that are configured to receive the leg portions of the light source.

13. The electronic device defined in claim 1 further comprising screws that are configured to conduct heat from the light source through the thermally conductive elastomeric structures and the metal structure.

14. Apparatus, comprising:
    a metal housing structure;
    an electronic component;
    a thermally conductive elastomeric structure that is configured to mate with the electronic component to dissipate heat from the electronic component; and
    a metal bracket that mounts the electronic component to the metal housing structure and that presses the thermally conductive elastomeric structure and the electronic component towards the metal housing structure.

15. The apparatus defined in claim 14 wherein the metal housing structure comprises a housing wall with an opening aligned with the electronic component.

16. The apparatus defined in claim 15 further comprising a metal support structure interposed between the housing wall and the electronic component.

17. The apparatus defined in claim 16 wherein the electronic component comprises a light-emitting diode and wherein the metal support structure comprises a bracket with screw holes, the apparatus further comprising screws that pass through the screw holes and that screw into openings in the metal support structure.

18. Light source structures in an electronic device having a metal wall, comprising:
   a light source module containing a light-emitting diode;
   a silicone structure that is configured to mate with the light source module; and
   a metal bracket that holds the silicone structure against the light source module and the metal wall.

19. The light source structures defined in claim 18 wherein the light source module comprises a camera light source module including a light-emitting diode, wherein the silicone structure has sidewalls that surround the light source module, and wherein the metal wall comprises a metal housing wall.

20. The light source structures defined in claim 19 wherein the light source module has a flexible printed circuit and wherein the silicone structure has an opening through which the flexible printed circuit protrudes.

21. The light source structures defined in claim 20 further comprising:
   support structures interposed between the light source module and the metal housing wall;
   a rigid printed circuit coupled to the flexible printed circuit; and
   screws that couple the metal bracket to the support structures.

* * * * *